United States Patent [19]

Strand

[11] Patent Number: 4,846,600

[45] Date of Patent: Jul. 11, 1989

[54] APPARATUS FOR FORMING TUBULAR JOINTS

[76] Inventor: Dwaine L. Strand, 1408 E. Washington St., Boise, Id. 83712

[21] Appl. No.: 175,188

[22] Filed: Mar. 29, 1988

[51] Int. Cl.⁴ .............................................. B25G 3/00
[52] U.S. Cl. .................................... 403/260; 403/264; 403/263
[58] Field of Search ............... 403/260, 258, 264, 263; 285/184, 191, 185

[56] References Cited

U.S. PATENT DOCUMENTS 3,556,569  1/1971  Bruhn ............................. 403/263 X
3,921,960 11/1975  Bright ............................. 403/263 X
4,752,979  6/1988  Goacher, Sr. .................. 285/185 X

FOREIGN PATENT DOCUMENTS 582976 10/1958  Italy ..................................... 285/191

Primary Examiner—Andrew V. Kundrat
Attorney, Agent, or Firm—Leslie G. Murray

[57] ABSTRACT

An assembly rigidly joining a pair of tubular members together includes one tubular member having a shaped slot formed in its side wall for receiving the open end of another tubular member. An eyebolt has an eye projecting at the center of the shaped slot and a threaded end projecting on the side wall opposite the shaped slot. The open end of the other tubular member is inserted into the shaped slot an a cross bolt which passes through apertures in the side wall near the open end engages the eye such that when a nut is tightened up on the threaded end of the eyebolt, the other tubular member is axially drawn into abutment with the one tubular member forming a rigid, mechanical joint between the two tubular members.

3 Claims, 4 Drawing Sheets

APPARATUS FOR FORMING TUBULAR JOINTS

BACKGROUND OF THE INVENTION

The present invention relates generally to apparatus for forming joints between lengths of tubular stock or the like and, more particularly, to the use of an eyebolt and a crossbolt to join lengths of tubular stock together in a rigid joint.

It is well known in the art to join tubular elements such as used for hand rails, fences, furniture and the like using commonly available connector elements or, in the case of metal components, by welding. Connector elements should be inexpensive to manufacture and simple to assemble. Further, the connectors, when assembled, should form a mechanically strong and rigid joint between the tubular elements.

Australian Pat. No. 274,749 entitled "An Improved Strainer Post" issued to Robert Jordan Martin and Barbara Martin and published on Jan. 20, 1966 discloses apparatus for connecting sections of tubular pipe together comprising an eyebolt passing through a first pipe and a crossbolt through the end of a second pipe such that the crossbolt engages the eye and attaches the second pipe to the eyebolt. The eyebolt is inserted through the first pipe with the eye portion projecting on one side and the threaded portion projecting on the opposite side of the pipe. The open end of the second pipe is positioned over the projecting eye and the crossbolt is inserted through apertures in the second pipe near the open end engaging the eye and attaching the second pipe to the eye. A nut on the threaded portion of the eyebolt is then tightened up to draw the end of the second pipe firmly against the side of the first pipe to hold it in place, or, alternatively, the nut may be left relatively loose to allow the second pipe to pivot about an axis extending through the eye of the eyebolt. The coupling method disclosed by Martin et al, while being satisfactory for systems under tension, does not provide a joint having sufficient mechanical strength or rigidity for some applications. U.S. Pat. Nos. 3,471,182 and 3,851,981 provide additional examples of prior art connector elements.

SUMMARY OF THE INVENTION

In accordance with the principles of the present invention, apparatus to form rigid joints coupling lengths of tubular stock together is provided. A first tubular section or length of pipe to which a second tubular section or length of pipe is to be joined, has a shaped slot or hole made partially through it to allow partial insertion of the open end of the second or joining pipe into the side of the first tubular section. An aperture is provided through the tubular section side wall opposite to and centered on the shaped slot or hole for receiving the threaded end of an eyebolt. The eyebolt is inserted through the aperture with the threaded portion protruding through the pipe side wall and the eye portion centered in the shaped slot or hole and protruding beyond the pipe side wall. The open end of the second or joining tubular section is inserted into the shaped slot or hole with the eye portion of the eyebolt protruding into the open end of the joining tubular section. A crossbolt is inserted through apertures provided crosswise through the joining tubular section near the open end and passes through the eye of the eyebolt. A nut is then tightened on the threaded portion of the eyebolt drawing the end of the joining tubular section firmly into the shaped slot or hole forming a rigid and mechanically strong joint.

The present invention provides apparatus for joining two tubular sections together which is inexpensive to manufacture, simple to assemble and may be distributed as a kit of parts with instructions to enable homeowners and other unskilled or inexperienced persons to assemble tubular stock to form a variety of items for home or business use. These and other features and advantages will become readily apparent from the detailed description taken in conjunction with the accompanying drawings.

BRIEF DESCRIPTION OF THE DRAWINGS

The invention will now be described, merely by way of nonlimiting example, with reference to the attached drawings in which like reference numerals refer to like parts as illustrated in the different figures.

DETAILED DESCRIPTION OF THE PREFERRED EMBODIMENT

Figure 1:
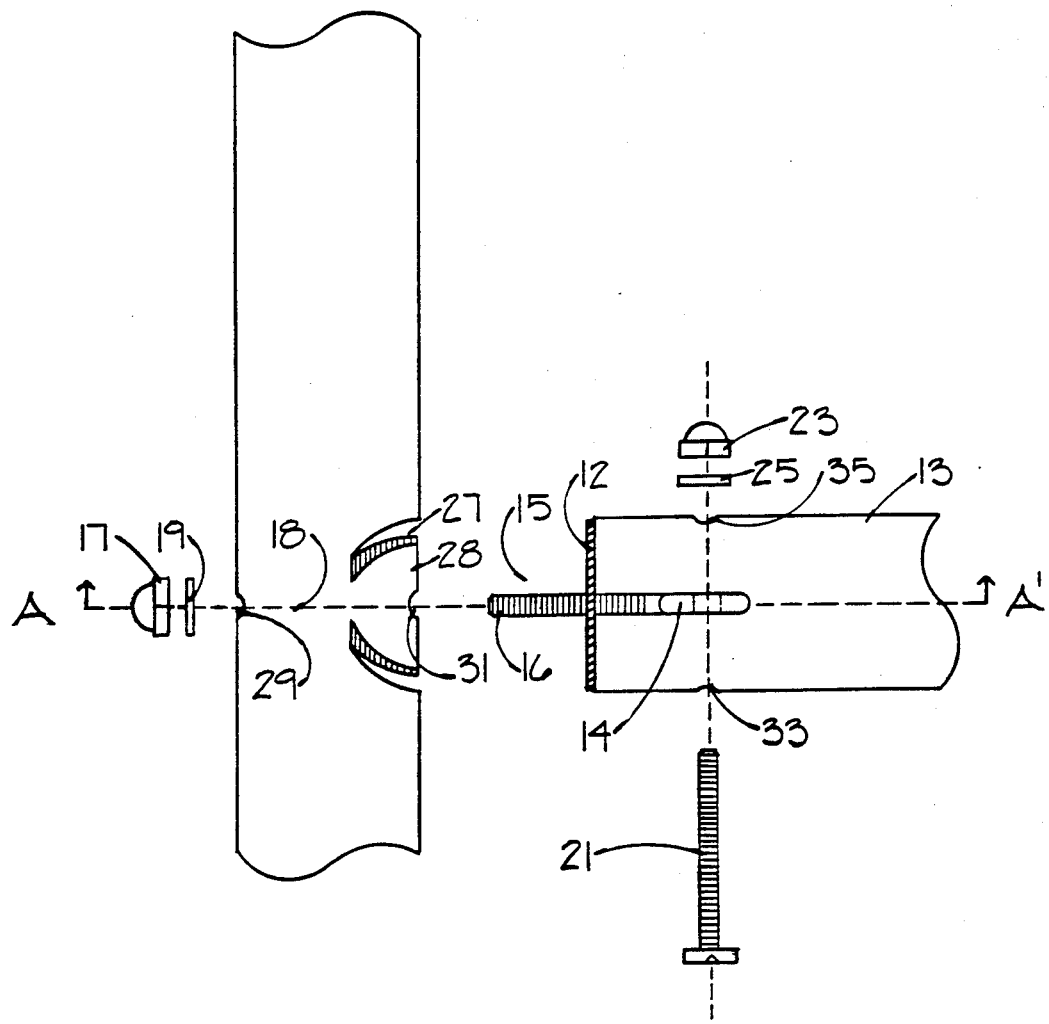
FIG. 1 is a cross-sectional view illustrating a pair of tubular sections and component elements in accordance with the present invention.
Figure 2:
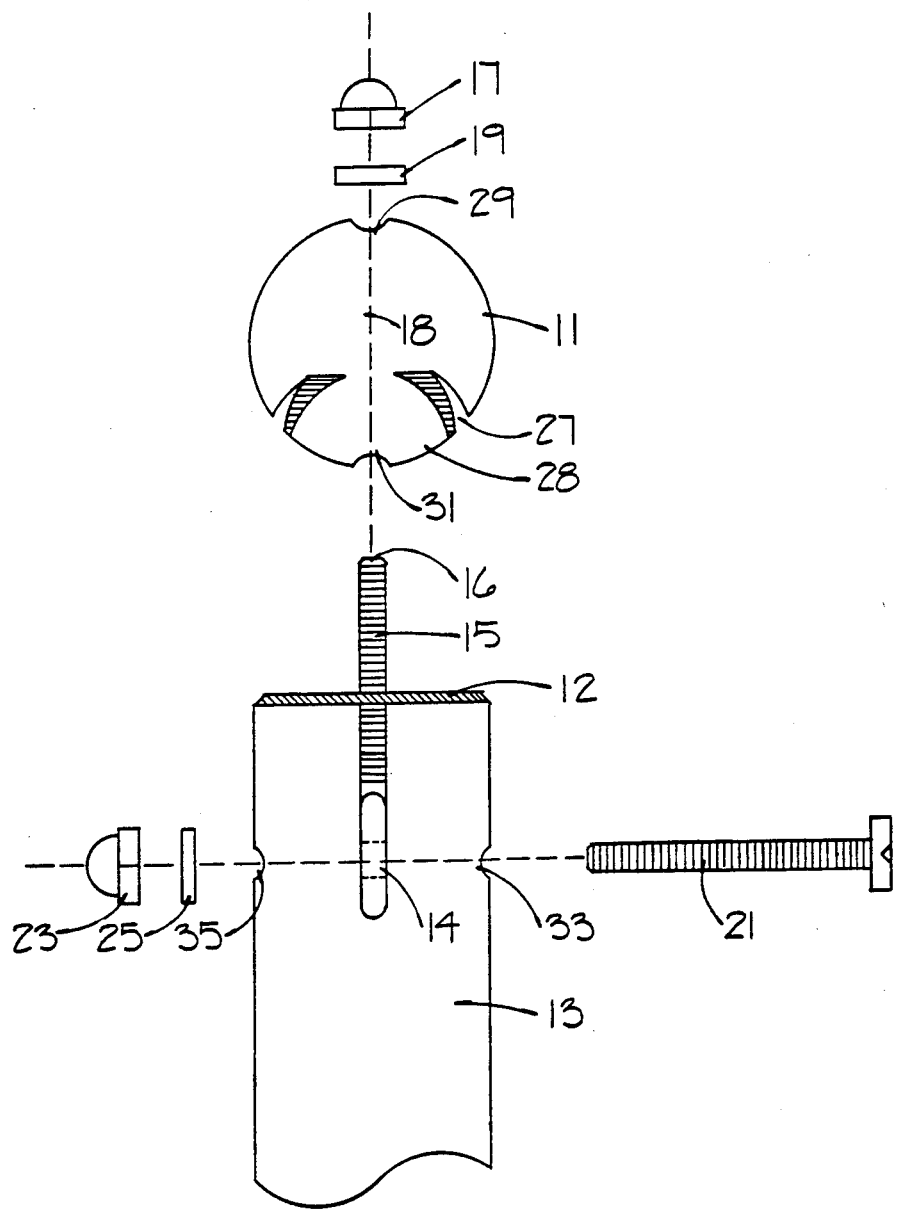
FIG. 2 is a cross-sectional view taken along line A—A' of the tubular sections and component elements of FIG. 1.

Referring now to FIGS. 1 and 2, the illustrated assembly of elements according to the present invention comprise a pair of tubular sections, a first elongated or continuous tubular section 11 and a joining tubular section 13, an eyebolt 15 having a nut 17 and washer 19 and a crossbolt 21 having a nut 23 and washer 25. In the embodiment illustrated, the tubular sections 11, 13 consist of a circular cross section, but may be rectangular or otherwise shaped. A shaped slot 25 is formed in the wall section of the continuous tubular section 11 which is complementary to the external profile of the open end 12 of the joining tubular section 13. The center section 28 may be removed to form a shaped hole (not shown), but retaining the center section 28 results in a stronger, more rigid joint when the two tubular sections 11, 13 are assembled. The eyebolt 15 has threaded end 16 which is inserted through apertures 29 and 31 provided in the side walls on a diameter of the continuous tubular section 11 and projects on the side opposite shaped slot 27 and engages washer 19 and nut 17. An eye 14 is formed on the opposite end of eyebolt 15 and projects from center section 28 aligned on center line 18. The nuts 17, 23 are preferably cap nuts in order to minimize the danger, such as snagged clothing or personal injury created by the projecting eye bolt 15.

Figure 3:
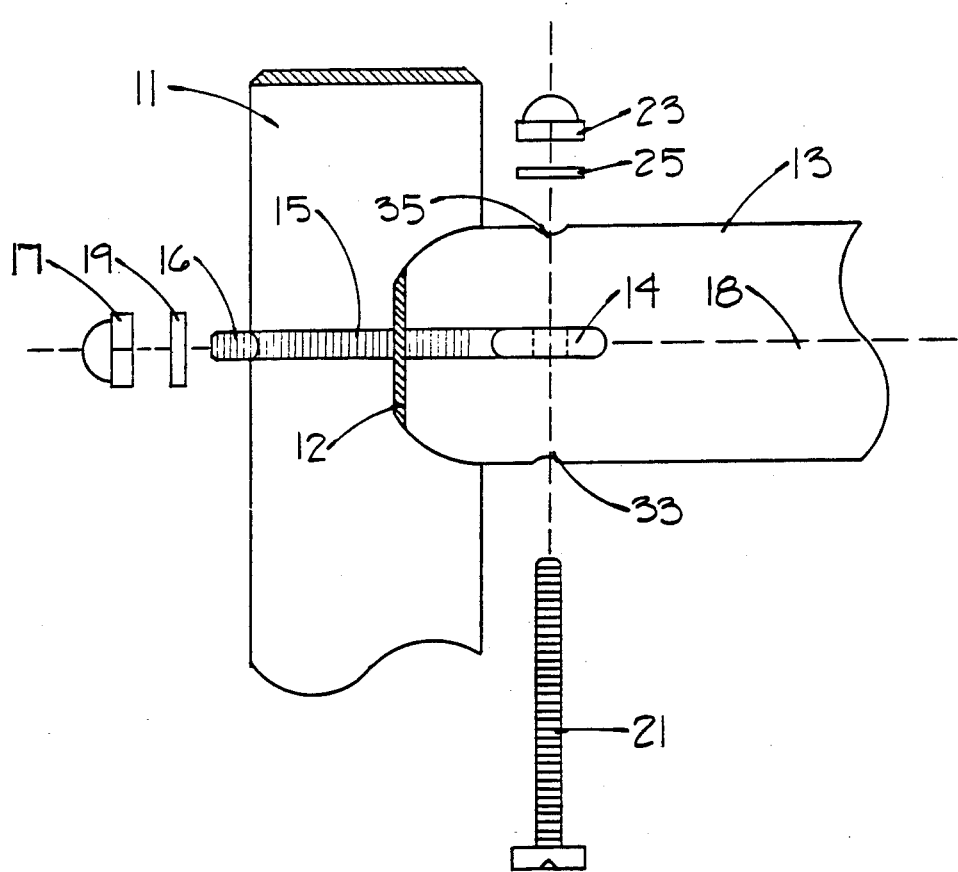
FIG. 3 is a perspective view showing a pair of tubular sections fitted together at right angles and forming an assembly according to the present invention.

Referring now also to FIG. 3, the joining tubular section 13 is partially inserted into shaped slot 27, as shown, such that the eye 14 projects inwardly into the open end 12 along the centerline 18 axis of tubular section 13. The crossbolt 21 is inserted crosswise, through apertures 33 and 35 drilled or punched in the side wall on a diameter of joining tubular section 13 and through the eye 14 of eyebolt 15. Crossbolt 21 is securely held in position by washer 25 and nut 23. The nut 17 is now securely tightened up against the side wall of tubular section 11 axially drawing the open end 12 of tubular section 13 fully into shaped slot 27 and securely retaining it in position to form a mechanically strong and rigid joint.

The illustrated assembly of tubular sections 11 and 13 of FIGS. 1-3 show a typical joint in which the pairs of tubular sections fit together at right angles. By suitably choosing the geometry of shaped slot 27 and the placement of apertures 29 and 31, a pair of tubular sections 11, 13 may be joined together at any desired angle with no decrease in the strength or rigidity of the joint thus achieved.

Figure 4:
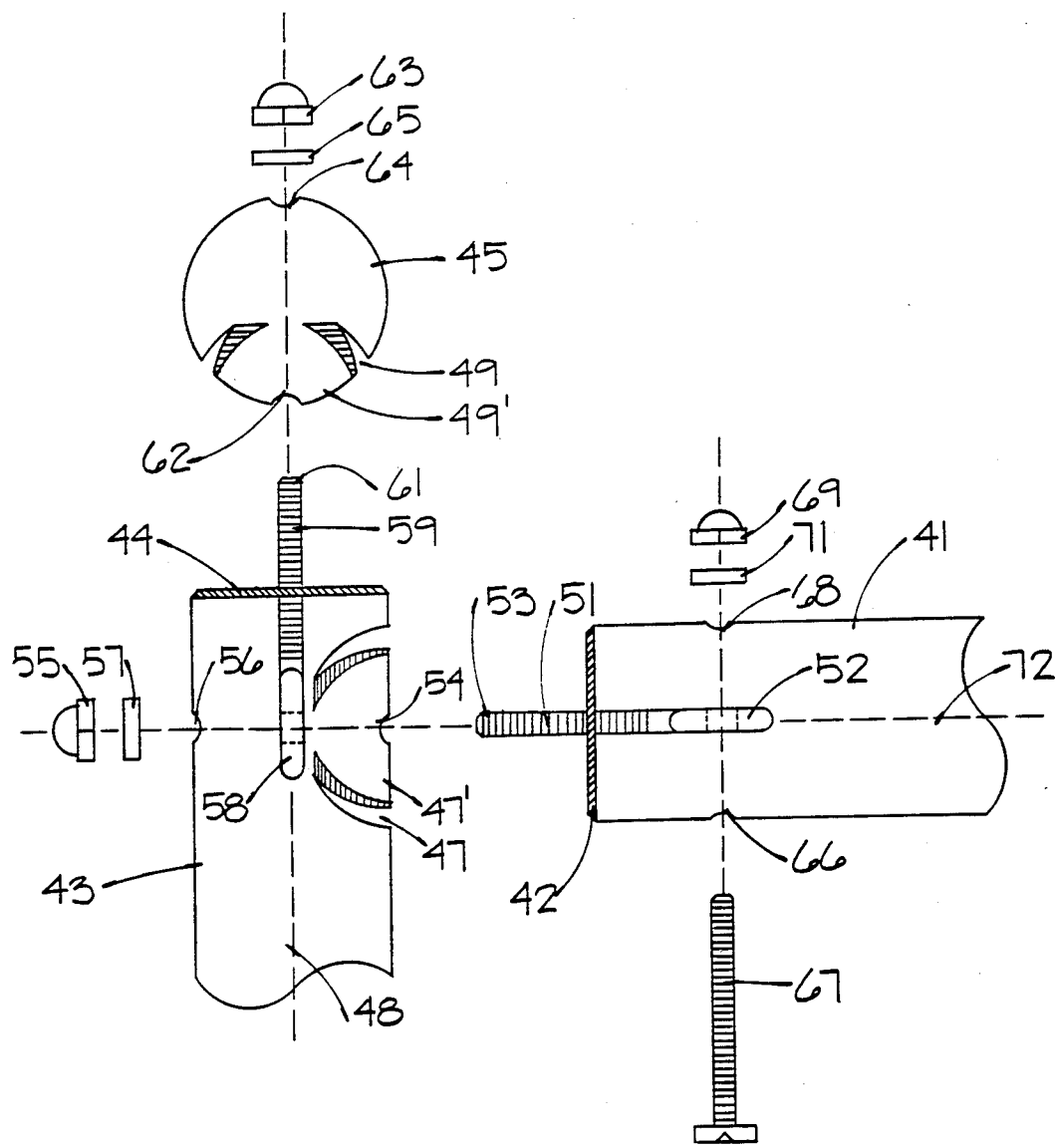
FIG. 4 is a cross-sectional view illustrating three tubular sections and component elements to form a corner assembly according to the present invention.

Referring now to FIG. 4, three tubular sections 41, 43 and 45 are joined together in accordance with the present invention to form a corner joint such as would be required when assembling a cart or a storage rack, for example. The tubular sections 43 and 45 have shaped slots or cuts 47 and 49, respectively. As described herein above, center sections 47' and 49' may be removed, but are preferably retained to form a stronger, more rigid joint. The threaded portion 61 of eyebolt 59 is inserted through apertures 62 and 64 on a diameter of continuous tubular section 45 and retained in place with washer 65 and nut 63. The open end 44 of joining tubular section 43 is partially inserted into shaped slot 49 with the eye 58 of eyebolt 59 projecting into the open end 44 along centerline axis 48. The threaded end 53 of eyebolt 51 is then inserted through apertures 54 and 56 provided in the side wall on a diameter of tubular section 43 and through the eye 58 of eyebolt 59. The threaded end 53 projects on the side wall of tubular section 43 opposite the shaped slot 47 and is retained in position by washer 57 and nut 55. The open end 42 of joining tubular section 41 is partially inserted into shaped slot 47 with the eye 52 of eyebolt 51 projecting into the open end 42 along centerline axis 72 of tubular section 41. The threaded crossbolt 67 is inserted through the apertures 66 and 68 in the side wall on a diameter of tubular section 41 and through the eye 52 of eyebolt 51. Nut 69 and washer 71 are securely tightened on crossbolt 67 to maintain tubular section 41 securely attached to the eyebolt 51. Nut 55 is securely tightened on the threaded end 53 of eyebolt 51 axially drawing the open end 42 of tubular section 41 fully into shaped slot 47 to form a strong, rigid joint between tubular sections 41 and 43. Now, in turn, nut 63 is securely tightened on the threaded end 61 of eyebolt 59 to axially draw joining tubular section 43 fully into shaped slot 49 to form a strong, rigid joint between tubular sections 43 and 45.

The eyebolts may be fabricated from metal rod with the eye formed at one end and the other end threaded to receive a nut and washer. The crossbolts may be any of the several standard bolts and nuts available commercially. The tubular stock or sections are preferably of aluminum or other suitable metal, but may be of plastic or other material. Further, tubular material is not required to practice the present invention, solid stock, such as wooden rails, may be similarly joined.

I claim:

1. Apparatus adapted to form a rigid connection between first and second tubular members in abutting relationship comprising:

said first tubular member having a shaped slot formed in a sidewall thereof and a pair of apertures through said sidewall on a diameter of said first tubular member, said diameter being a centerline through the center of said shaped slot;

an elongated eyebolt having a first end threaded to receive a nut and a second end forming an eye, said first end inserted through said pair of apertures, said first end projecting from said sidewall opposite said shaped slot, said second end projecting from said sidewall at the center of said shaped slot;

said second tubular member having an open end, said shaped slot being complementary to the exterior side wall of said open end, said second member having a pair of apertures through said sidewall on a diameter near said open end of said second tubular member, said open end partially inserted into said shaped slot, said second end of said elongated eyebol projecting into the bore of said second tubular member along the longitudinal axis of said second tubular member;

a bolt and nut assembly, said bolt inserted through said pair of apertures in the sidewall of said second tubular member and through the eye of said eyebolt engaging said eyebolt and attaching said second tubular member to said elongated eyebolt; and a nut for securely attaching said elongated eyebolt to said first tubular member and for cooperating with said elongated eyebolt axially urging said second tubular member into abutting relationship with said first tubular member, said axial movement fully inserting said open end into said shaped slot.

2. An assembly adapted to form a rigid connection between first and second tubular members comprising:

said first tubular member having a shaped hole formed in a sidewall thereof, and an aperture through said sidewall opposite said shaped hole;

an elongated eyebolt having a first end threaded to receive a nut and a second end defining an eye, said elongated eyebolt inserted through said shaped hole, said first end projecting through said aperture;

said second tubular member having an open end, said shaped hole being complementary to the exterior sidewall of said open end, said open end inserted into said shaped hole, said second end of said elongated eyebolt projecting into the bore of said second tubular member, said second tubular member having a pair of apertures through its sidewall on a diameter thereof near said open end;

a nut and bolt assembly, said bolt inserted through said pair of apertures in the sidewall of said second tubular member and through the eye of said elongated eyebolt engaging said eyebolt and attaching said elongated eyebolt to said second tubular member; and a nut in cooperation with the first end of said elongated eyebolt for attaching said elongated eyebolt to said first tubular member and for axially urging said second tubular member into abutting relationship with said first tubular member and rigidly maintaining said open end in said shaped hole.

3. An assembly as in claim 2 wherein all said nuts comprise capnuts.

* * * * *